US009696476B1

(12) United States Patent
Glebov et al.

(10) Patent No.: US 9,696,476 B1
(45) Date of Patent: Jul. 4, 2017

(54) VOLUME MOIRÉ BRAGG GRATINGS IN A PHOTOSENSITIVE MATERIAL

(75) Inventors: Leonid B. Glebov, Orlando, FL (US); Julien Lumeau, Oviedo, FL (US); Sergiy Mokhov, Orlando, FL (US); Vadim Smirnov, Orlando, FL (US); Boris Zeldovich, Orlando, FL (US)

(73) Assignees: Optigrate Corporation, Orlando, FL (US); University of Central Florida Research Foundation, Inc., Orlando, FL (US)

( * ) Notice: Subject to any disclaimer, the term of this patent is extended or adjusted under 35 U.S.C. 154(b) by 379 days.

(21) Appl. No.: 12/780,202

(22) Filed: May 14, 2010

Related U.S. Application Data

(60) Provisional application No. 61/178,561, filed on May 15, 2009.

(51) Int. Cl.
*G02B 5/32* (2006.01)
*G02B 5/00* (2006.01)

(52) U.S. Cl.
CPC  *G02B 5/32* (2013.01); *G02B 5/00* (2013.01)

(58) Field of Classification Search
CPC ........ G02B 5/32; G02B 27/48; G02B 5/0252; G02B 27/0944; G02B 27/225; G02B 19/0042; G02B 27/0081; G02B 6/00; G02B 19/0004; G02B 2027/0118; G02B 2027/0174; G02B 27/0172; G02B 27/0927; G02B 5/18; G02B 5/1861; G02B 17/004
USPC ................ 369/103, 109.01; 385/36–38, 131; 359/1, 3, 123, 326, 315, 566; 430/1, 2, 430/290, 330
See application file for complete search history.

(56) References Cited

U.S. PATENT DOCUMENTS

| | | | | |
|---|---|---|---|---|
| 4,094,575 A | * | 6/1978 | Kellie | G02B 5/1842 359/10 |
| 6,317,226 B1 | * | 11/2001 | Yeh et al. | 359/2 |
| 6,586,141 B1 | | 7/2003 | Efimov | |
| 7,391,703 B2 | * | 6/2008 | Volodin et al. | 369/103 |
| 7,444,049 B1 | * | 10/2008 | Kim et al. | 385/37 |
| 7,697,589 B2 | * | 4/2010 | Volodin et al. | 372/102 |

(Continued)

OTHER PUBLICATIONS

Reid et al. "Phase-Shifted Moire Grating Fibre Resonators," 1990, Electronics Letters, vol. 26.*

(Continued)

*Primary Examiner* — Scott J Sugarman
*Assistant Examiner* — Sharrief Broome
(74) *Attorney, Agent, or Firm* — Bond, Schoeneck & King, PLLC; William Greener

(57) ABSTRACT

Complex spectral and angular diffractive optical elements in photosensitive materials based on Moiré pattern are proposed and demonstrated. The process is based on the recording of multiple volume Bragg gratings with controlled difference of the periods in the same volume of photosensitive material. Filters with ultra-narrow bandpass in the range of a few picometers to a few tens of picometers or apodized diffractive optical elements across large aperture are demonstrated. Several methods to fabricating such Moiré Bragg gratings are proposed. Experimental demonstration of a Moiré ultra-narrowband diffractive optical element in PTR glass is performed.

29 Claims, 14 Drawing Sheets

(56) References Cited

U.S. PATENT DOCUMENTS

2002/0045104 A1* 4/2002 Efimov et al. .................. 430/2
2008/0080585 A1* 4/2008 Glebov et al. ................ 372/102

OTHER PUBLICATIONS

Childs et al. "Experimental study of the thermal properties of Moire Long Period Gratings," 2007. SPIE vol. 6830.*
Hsieh et al. "Athermal Holgoraphic Filters," 2004, IEEE photonics Technology Leters. vol. 16.*
P.A.M Dos Santos. "Moiré-Like Patterns as a Spatial Beat Frequency in Photorefractive Sinusoidal Phase Gratings Superposition," Oct. 1, 2002. Optics Communications vol. 212 pp. 211-216.*
Kashyap, "Fiber Bragg Gratings," 1999, Academic Press, Chapter 5, p. 202.*
Childs et al. (Non-Patent Literature Document of record Entitled "Experimental Study of the thermal properties of Moir6 Long Period Gratings." SPIE, vol. 6830.)*
dos Santos (Non-Patent Literature of record Entitled "Moire-Like Patterns as a Spatial Beat Frequency in Photorefractive Sinusoidal Phase Gratings Superposition," Oct. 1, 2002. Optics Communications vol. 212 pp. 211-216.)*
Childs et al. (Non-Patent Literature Document of record Entitled "Experimental Study of the thermal properties of Moire Long Period Gratings." SPIE, vol. 6830).*
Reid et al. (Non-Patent Literature entitled "Phase Shifted Moire Grating Fibre Resonators" Electronics Letters, vol. 26) hereinafter Reid, as evidenced by Kashyap (Non-Patent Literature entitled "Fiber Bragg Gratings," 1999, Academic Press, Chapter 5, p. 202).*
Hsieh (Non-Patent literature of record entitled "Athermal Holographic Filters." IEEE Photonics Technology Letters, vol. 16 ).*
Lumeau, et al., Ultranarrow Bandpass Hybrid Filter with Wide Rejection Band, Applied Optics, 2006, pp. 1328-1332, vol. 45, issue 7, abstract.
Barmenkov, et al., Effective Length of Short Fabry-Perot Cavity Formed by Uniform Fiber Bragg Gratings, Optics Express, 2006, pp. 6394-6399, vol. 14, issue 14, abstract.
Lumeau, et al., Phase-Shifted Volume Bragg Gratings in Photo-Thermo-Refractive Glass, Proc. of SPIE, 2008, pp. 68900A-1-68900A-6, vol. 6890.
Kashyap, Fiber Bragg Gratings, Academic Press, 1999, 1st edition, book review.
Chen, et al., Fabrication of Transmission Filters with Single or Multiple Flattened Passbands Based on Chirped Moire Gratings, Electronics Letters, 1999, pp. 584-585, vol. 35. issue 7, abstract.
Lumeau, et al., Reflection of Light by Composite Volume Holograms: Fresnel Corrections and Fabry-Perot Spectral Filtering, J. Opt. Soc. Am. a Opt. Image Sci. Vis., 2008, pp. 751-764, vol. 25, issue 3, abstract.
Kogelnik, Coupled Wave Theory for Thick Hologram Gratings, the Bell System Technical Journal, 1969, pp. 2909-2947, vol. 48, issue 9, abstract.
Mokhov, et al., Propagation of Electromagnetic Waves in Non-Uniform Volume Bragg Gratings, Frontiers in Optics, OSA Technical Digest (CD), 2008, conference, abstract.
Lumeau, et al., Tunable Narrowband Filter Based on a Combination of Fabry-Perot Etalon and Volume Bragg Grating, Optics Letters, 2006, pp. 2417-2419, vol. 31, issue 16.
Tsui, et al., Coupled-Wave Analysis of Apodized Volume Gratings, Optics Express, 2004, pp. 6642-6653, vol. 12, issue 26.
Stetson, Holography with Total Internally Reflected Light, Appl. Physics Letter, 1967, pp. 225-226, vol. 11, issue 7, abstract.
Hariharan, Optical Holography: Principles, Techniques, and Applications, 1984, book review.
Macleod, Thin-Film Optical Filters, 2001, book review.

* cited by examiner

VOLUME MOIRÉ BRAGG GRATINGS IN A PHOTOSENSITIVE MATERIAL

This application claims the benefit of priority to U.S. Provisional Application No. 61/178,561 filed on May 15, 2009 and was funded in part by NASA GSFC contract NNG07-CA04C.

FIELD OF THE INVENTION

This invention relates to diffractive optical elements and, in particular, to methods for fabricating complex diffractive optical elements by recording two or more volume Bragg gratings with different periods in the same volume of photosensitive material that results in additional spatial modulation of a refractive index modulation profile with a larger period determined by the difference between the periods of original gratings, known as the Moiré period.

BACKGROUND AND PRIOR ART

The ideal recording material for holography should have a spectral sensitivity well matched to available laser wavelengths, a linear transfer characteristic, high resolution, and low noise, should be indefinitely recyclable or relatively inexpensive. Hariharan reports on page 95 of his book P. Hariharan. Optical Holography. Principles, techniques, and applications. Chapter 7: "Practical recording materials," 95-124. Cambridge University Press, 1996. P. 95 that "While several materials have been studied, none has been found so far that meets all these requirements". The lack of available materials for phase holographs has stimulated the search for new approaches.

U.S. Pat. No. 6,586,141 issued on Jul. 1, 2003 to O. M. Efimov, L. B. Glebov, L. N. Glebova, V. I. Smirnov, owned by the same assignee as this application and having at least one common inventor described the process for production of high efficiency volume diffractive elements in photo-thermo-refractive glass which is incorporated herein by reference. This invention teaches how a photo-thermal process based on precipitation of dielectric microcrystals in the bulk of glass exposed to UV radiation and aged at elevated temperature can be used to record a high-efficiency volume phase hologram in glass because of a difference between refractive indices of exposed and unexposed areas of glass blank.

According to the present invention and references herein, the first step of the proposed process is the exposure of the glass sample to UV radiation, which produces ionization of a cerium ion. The electrons released from cerium are then trapped by a silver ion. As a result, silver is converted from a positive ion to a neutral atom. This stage corresponds to a latent image formation and no significant coloration or refractive index change occurs. The next step is thermal development. This development process includes two stages. The first involves the high diffusion rate silver atoms possess in silicate glasses. This diffusion leads to creation of tiny silver containing particles at relatively low temperatures in a range of approximately 450-500° C. A number of silver containing particles arise in exposed regions of glass after aging at elevated temperatures. These silver containing particles serve as the nucleation centers for sodium and fluorine ion precipitation and cubic sodium fluoride crystal growth occurs at temperatures between 500° C. and 550° C. Interaction of crystalline phase with glass matrix at elevated temperatures results in decreasing of refractive index in exposed areas compare to that in unexposed ones. This phenomenon was named the "photo-thermo-refractive" (PTR) process. Glasses, which possess such properties, were called "photo-thermo-refractive" (PTR) glasses.

Conditions of glass technology, exposure and development were found in that work to create volume holographic gratings (Bragg gratings) with relative diffraction efficiency exceeding 97%. The maximum recorded spatial frequency was about 10,000 $mm^{-1}$. These gratings were stable up to about 400° C. The photosensitivity (difference of refractive indices between exposed and unexposed areas up to $10^{-3}$) was found in the range of several hundred $mJ/cm^2$ at a helium-cadmium laser wavelength (about 325 nm). The absorption band of $Ce^{3+}$, which is used for photo-ionization, has maximum near 300 nm and a long wavelength tale of up to 350 nm. This means that several commercial lasers such as $N_2$, Ar, He—Cd, etc., emitting in this area can be used for recording. Once developed, holograms in PTR glass were not destroyed by further exposure to visible light. These properties of PTR holographic elements resulted in wide application of this technology for different laser systems operating in visible and near IR spectral regions.

However, many applications of holographic optical elements require high efficiency diffractive optical elements with narrower bandpass. Such elements, if used as selective components in lasers or in photo-receiving devices, can dramatically improve the performances of laser systems. However, high efficiency diffractive optical elements are limited to bandwidth higher than 30-40 μm due to limitation of PTR glass properties and recording system.

As already mentioned above, many solutions have been proposed to manufacture ultra-narrowband filters. H. A. Macleod, Thin-Film Optical Filter (Macmillan), third ed., Institute of Physics Pub., New York, 2001, pp. 37-53 teaches how to combine regular dielectric mirrors in order to create a Fabry-Perot cavity. However, such a filter requires the deposition of multi-layer coatings, the polishing of very high quality optical windows in order to produce ultra narrow bandpass associated with high throughput.

In J. Lumeau, M. Cathelinaud, J. Bittebierre and M. Lequime, "Ultra-narrow bandpass hybrid filter with wide rejection band", Applied Optics 45 (7) 1328-1332 (2006), it was proposed to replace one of the mirrors of the Fabry-Perot cavity with a fiber Bragg grating. That way it is possible to select only one resonance of the Fabry-Perot cavity due to the spectral selectivity of the fiber Bragg grating and therefore to improve rejection. However, the experimental demonstration was only carried out in wave guided configuration.

In Y. O. Barmenkov, D. Zalvidea, S. Torres-Peiró, J. L. Cruz, and M. V. Andrés, Effective length of short Fabry-Perot cavity formed by uniform fiber Bragg gratings, Optics Express 14 (14) 6394 (2006), the co-inventors proposed replacing of both dielectric mirrors with two fiber Bragg gratings. In this case they showed that ultra-narrow bandpass filter can be fabricated. However, fabricated filters were also limited to the guided configuration and the method to implement such a filter did not include any issue regarding alignment of the two fiber Bragg gratings since they were self aligned inside the fiber.

In J. Lumeau, V. Smirnov, and L. B. Glebov, "Phase-shifted volume Bragg gratings in photo-thermo-refractive glass", Proceeding of SPIE 6890, paper 68900A, (2008), authors demonstrated that two volume reflecting Bragg gratings recorded in PTR glass can be coherently combined in air in order to form a Fabry-Perot cavity. It was demonstrated that an ultra-narrowband filter with high throughput can be achieved, proving the ability of PTR glass to be used in such a resonant structure. However, the filter demonstrated was not monolithic and therefore not stable and not suitable for practical optical applications.

This problem was overcome in fibers by recording two superimposed fiber Bragg gratings (FBGs) with different periods within the same area of the fiber to obtain a Moiré Fiber Bragg Grating that allows obtaining a filter with properties similar to the one described and shown by a co-inventor in J. Lumeau, V. Smirnov, and L. B. Glebov, "Phase-shifted volume Bragg gratings in photo-thermo-refractive glass", Proceeding of SPIE 6890, paper 68900A, (2008), but monolithic and in fiber described in R. Kashyap, "Fiber Bragg Gratings", Academic Press; 1st edition (May 15, 1999). Such a structure was widely investigated in L. R. Chen, H. S. Loka, D. J. F. Cooper, P. W. E. Smith, R. Tam and X. Gu, "Fabrication of transmission filters with single or multiple flattened passbands based on chirped Moiré gratings", Electronics Letters 35 (7) P. 584-585 (1999). However, due to the unavailability of bulk photosensitive materials, no investigation of bulk Moiré Fiber Bragg Gratings was performed.

What is needed is methods and systems to combine a Fabry-Perot cavity from volume Bragg gratings (VBGs) within one structure, and thus to form a Fabry-Perot filter which cavity and mirrors are composed by two superimposed VBGs. This invention teaches how to extend the technology of producing high efficiency diffractive optical elements in photosensitive material, e.g. PTR glass, to the fabrication of diffractive optical elements with narrower bandpass and apodized diffractive optical elements. Applications of those elements in military optical systems (laser radars, tracking systems, high-power lasers, etc.), optical communications (transmitters and receivers, WDM filters, etc.) and other markets should be extremely beneficial.

SUMMARY OF THE INVENTION

A primary objective of the invention is to provide methods to multiplex two or more VBG recorded in a photosensitive material, e.g. photo-thermo-refractive glass; within the same volume in order to produce new volume diffractive elements such as a narrow bandpass filter with narrower bandwidth than that for a single reflecting Bragg grating or an apodized reflecting Bragg grating.

A secondary objective of the invention is to provide methods combine Fabry-Perot cavity and RBG within one structure, and thus to form a Fabry-Perot filter which cavity and mirrors composed by two superimposed RBGs.

A third objective of the present invention is to provide methods to multiplex two or more volume Bragg gratings (VBGs) recorded in a photosensitive material for applications in of those elements in military optical systems including laser radars, tracking systems, high-power lasers, etc., optical communications such as transmitters and receivers, WDM filters, etc. and other markets.

A first embodiment provides a method of fabricating a complex diffractive optical element by providing one single volume of photosensitive material and recording at least two different volume Bragg gratings with different periods in the one single volume of a photosensitive material resulting in additional spatial modulation of a refractive index modulation profile with a larger period determined by a difference between periods of the at least two volume Bragg gratings. The at least two different volume Bragg gratings can be a Moiré Bragg grating; can be recorded as one semi-period of a Moiré pattern to produce a VBG with suppressed side lobes; can be recorded as two semi-periods of Moiré pattern to produce a high throughput narrowband transmitting filter; and can be recorded as an arbitrary (including non-integral) number of Moiré semi-periods to produce a complex diffractive optical element with specific spectral and angular selectivity.

A plurality of complex diffractive elements could be produced with this method, such as a grating with the Moiré vector tilted in respect to normal to the surface and/or direction of beam propagation to produce a diffractive optical element with complex spectral and angular features; at least two different volume Bragg gratings each having a different amplitude of refractive index modulation for a complex spectral and angular filtering based on a Moiré effect. Different methods can be used for recording of Moiré gratings, such as sequential two-beam one-sided holographic recording keeping the vectors of the gratings collinear; sequential single-beam one-sided holographic recording based on a total internal reflection from the rear surface of the photosensitive material; or sequential single-beam one-sided holographic recording with a layer of material having a refractive index greater than the refractive index in air by adjusting an adjustable mirror located adjacent to the rear surface of the photosensitive material to provide control of original phase of the Moiré pattern.

In an embodiment a beamsplitter is used to produce two coherent beams and the two beams are redirected with a reflecting element to produce an interference pattern for a sequential two-beam two-sided holographic recording keeping vectors of the elementary gratings collinear, and the position of one of the redirecting reflecting elements can be controlled with high precision to control the original phase of the volume Bragg grating and the Moiré pattern.

A second embodiment provides another method of fabricating a complex diffractive optical element by providing one single sample plate of a photosensitive material and recording at least two different volume Bragg gratings with different periods in the same volume of photosensitive material resulting in additional spatial modulation of a refractive index modulation profile with a period determined by the difference between periods of the at least two volume Bragg gratings as a Moiré period. The recording step can include placing an optical element adjacent to a first side of the plate and coupling a light beam through the optical element into the one single sample plate, wherein the incident angle of the light beam propagating through the plate is larger at the second side of the plate than the angle of total internal reflection and the incident beam is reflected and the reflected beam propagates back to the first side of the one single sample plate interfering with the incidence beam to record the volume Bragg grating wherein the sequential coupling of the light beam at a different incident angle will produce the second elementary grating and a Moiré Bragg grating according to difference in periods of elementary gratings. The photosensitive material can be a sample plate of a PTR glass.

The method can include controlling an angle of incidence of the recording beam to control the angle between the incident and reflected beams. This angle controls the period of the recorded grating. Placing a layer with refractive index matching photosensitive material and a mirror under the second surface of the photosensitive glass plate provides control of the original phase of elementary volume Bragg grating and a Moiré pattern when two superimposed volume Bragg gratings are recorded. The method can include changing the temperature of a photosensitive plate during recording while keeping the same incident angle to control a difference of periods; selecting the thickness of the photosensitive plate in accordance with the shift of grating period to fabricate the Moiré Bragg grating having one or two periods of refractive index modulation profile; controlling a bandwidth of the Moiré Bragg grating by the difference between periods of the at least two volume Bragg gratings; and/or controlling the bandwidth of the Moiré Bragg grating by the thickness of the photosensitive plate; controlling the bandwidth of the Moiré Bragg grating by the amplitude of the refractive index modulation of each recorded volume Bragg grating.

The method can further include arranging a tilt of the grating vector in respect to the plate normal to produce a tunable Moiré filter, wherein the phase shift of the Moiré pattern varies linearly with lateral coordinate X and spectral shape of a Moiré Bragg gratings would be gradually varied across the aperture; varying a number of Moiré periods of refractive index modulation profiles to change the spectral profile of the Moiré Bragg grating; and/or one single semi-period Moiré Bragg grating to obtain apodization of the reflection spectrum of reflecting Bragg gratings.

A third embodiment provides a complex diffractive optical element including one single photosensitive material plate and two or more volume Bragg gratings with different periods recorded in the same photosensitive material to produce a spatial modulation of a refractive index modulation profile with a period determined by the difference between the Moiré period of the two or more volume Bragg gratings. The photosensitive material can be PTR glass.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Volume diffractive elements are components that find many applications in large range of domains such as the optical telecommunications, the fluorescence spectroscopy, astronomy, laser stabilization . . . . However, for some of these applications, ultra-narrow bandwidths in the range of a few picometers to a few tens of picometers are required.

Figure 1A:
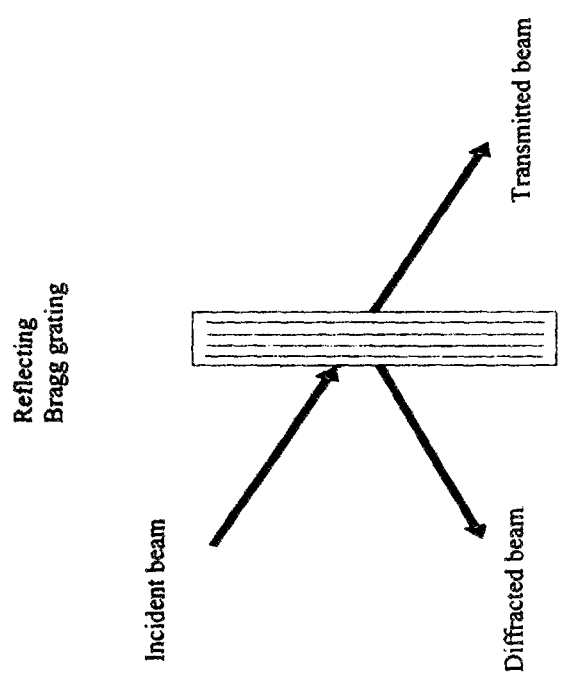
FIG. 1a shows a ray tracing of a uniform reflecting Bragg grating.
Figure 1B:
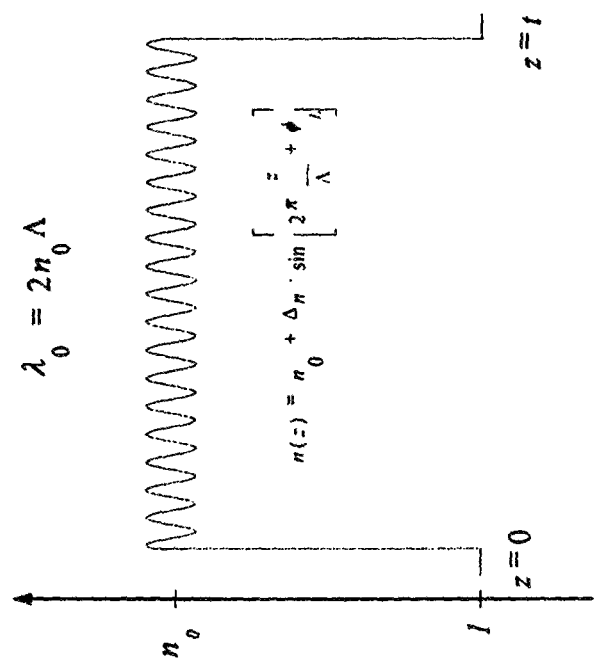
FIG. 1b shows a spatial profile of refractive index of a uniform reflecting Bragg grating.

U.S. Pat. Nos. 6,586,141 and 6,673,497 assigned to the same assignee as this application and having at least one common inventor teach how to record high efficiency volume diffractive elements in photo-thermo-refractive (PTR) glass. PTR glass is a photosensitive silicate glass doped with cerium, silver, and fluorine. The precipitation of a minor crystalline phase after UV-exposure and thermal development induces a refractive index change. This photosensitivity is the phenomenon that is used for the recording of so-called volume Bragg gratings. Reflecting Bragg gratings (RBGs) are one of the types of high efficiency gratings that can be recorded in PTR glass as shown in FIG. 1. They are obtained by recording of a sinusoidal refractive index modulation in a photosensitive medium. With such a RBG shown in FIG. 1 as an example, the planes of iso-refractive indices are parallel to the faces of the plate in which it was recorded (grating vector is parallel to normal to the plate surface) and the beam is diffracted in the same side as the incident beam.

Figure 2:
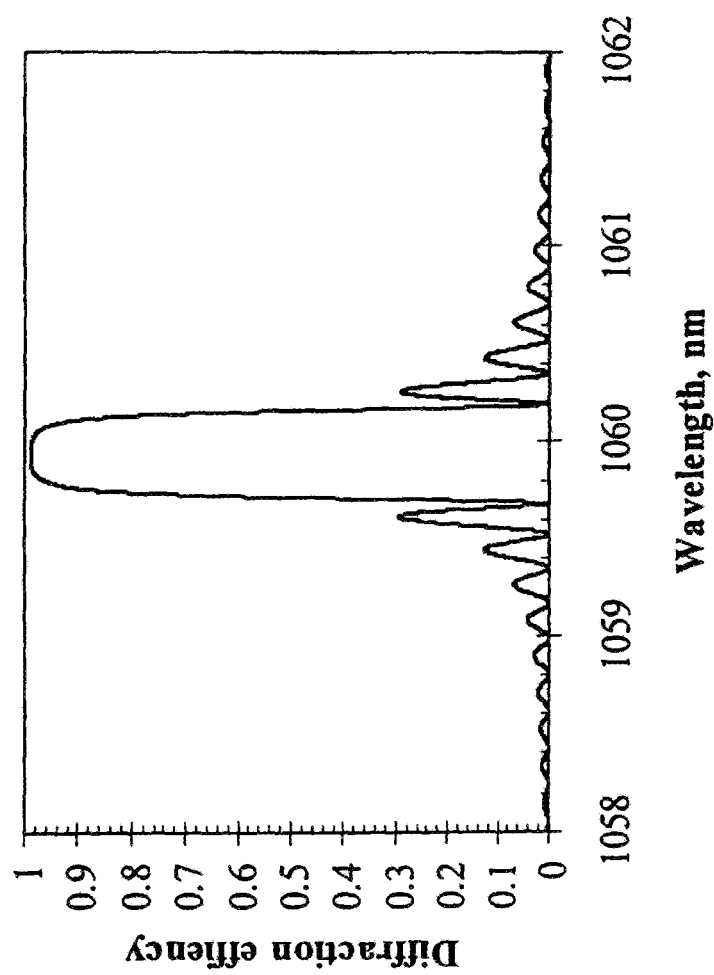
FIG. 2 is a graph showing the spectral selectively of a reflective Bragg grating with a central wavelength of 1060 nm.

In a general case, the grating vector can be tilted in respect to the surface normal. A reflective Bragg grating can function as a narrow-band reflection filter as shown in FIG. 2 which is a graph showing the spectral selectively of a reflective Bragg grating with a central wavelength of 1060 nm, a thickness of approximately 5 mm and refractive index of modulation of approximately 200 ppm. Typical bandwidth for a grating in PTR glass is less than 1 nm and angular selectivity is generally between 1 and 100 mrad. However, the spectral bandwidth is generally limited to values higher than 100 μm due to the problem of distortion and thickness of the RBG. As a result, by itself, a reflective Bragg grating does not allow reaching very narrow bandwidth.

An alternative method for obtaining a very narrow bandpass includes forming a Fabry-Perot cavity. Such a filter generally consists of a high quality optical window with both faces having identical dielectric coatings. The transmission of a Fabry-Perot etalon is a discrete comb spectrum (each resonance has a transmission equal to one assuming no losses) and narrow lines are all separated by gaps with constant width defined as the free spectral range of the etalon (typically between 0.1 nm and 10 nm).

J. Lumeau, M. Cathelinaud, J. Bittebierre and M. Lequime, "Ultra-narrow bandpass hybrid filter with wide rejection band", Applied Optics 45 (7) 1328-1332 (2006) proposed a first solution which consisted of replacing one of the mirrors of the Fabry-Perot cavity with a fiber Bragg grating. Y. O. Barmenkov, D. Zalvidea, S. Torres-Peiró, J. L. Cruz, and M. V. Andrés, "Effective length of short Fabry-Perot cavity formed by uniform fibre Bragg gratings", Optics Express 14 (14) 6394 (2006) proposed replacing both dielectric mirrors with two fiber Bragg gratings. In both papers, authors demonstrated that it is possible to obtain a very narrow bandpass with high throughput using such structures. However, in both cases, the filters were based on guided structures and no free space structures were demonstrated.

This can be explained by the fact that until recently, high quality volume Bragg gratings having the parameters required were not available. Recently it was demonstrated that two RBGs recorded in PTR glass can be coherently combined in air in order to form a Fabry-Perot cavity. It was demonstrated that ultra-narrowband filter with high throughput can be achieved, proving the ability of PTR glass to be used in resonant structure as described by co-inventors in J. Lumeau, V. Smirnov, and L. B. Glebov, "Phase-shifted volume Bragg gratings in photo-thermo-refractive glass", Proceeding of SPIE 6890, paper 68900A, (2008). However, the filter that was demonstrated was not monolithic and therefore was not stable and not suitable for practical optical applications.

To solve the problems, the present invention describes the principle and the fabrication of volume Moiré Bragg gratings (MBGs), resulting from the recording of two or more VBGs with different periods, which means that relative difference of periods is much smaller than unity. A Moiré pattern is a pattern created by two grids having slightly different periods. When each grid is produced by the interference of two beams, the superposition of two shifted VBGs and the recording of Moiré VBGs is obtained. Such structure was widely investigated in fibers as described in L. R. Chen, H. S. Loka, D. J. F. Cooper, P. W. E. Smith, R. Tam and X. Gu, "Fabrication of transmission filters with single or multiple flattened passbands based on chirped Moiré gratings", Electronics Letters 35 (7) P. 584-585 (1999). However, due to the unavailability of bulk photosensitive materials, no investigation of bulk MBGs was performed.

The methods of the present invention multiplex two or more volume Bragg gratings (VBG) recorded in photosensitive material, e.g. photo-thermo-refractive glass; within the same volume in order to produce new volume diffractive elements such as a narrow bandpass filters with narrower bandwidth than that for a single Bragg grating or an apodized reflecting Bragg grating.

In application to VBGs, the phenomenon of Moiré pattern is illustrated by a well-known formula of trigonometry as $$\cos(\alpha) + \cos(\beta) = 2\cos\left(\frac{\alpha+\beta}{2}\right)\cos\left(\frac{\alpha-\beta}{2}\right) \quad \text{Eq. (1)}$$

Equation (1) shows that a combination of two elementary periodic functions with different periods results in a complex pattern which has a high frequency component with a period that is an average between elementary periods and low frequency envelope with a period determined by the difference between the elementary periods. Considering a as the spatial phase of the first elementary VBG, $\alpha = Q_1 \cdot r$ (with $Q_1$ being the grating vector of elementary VBG), and $\beta$ as the phase of the second elementary VBG, $\beta = Q_2 \cdot r$, one may represent the resultant modulation of refractive index in the form $$\cos(Q_1 \cdot r) + \cos(Q_2 \cdot r) = 2\cos(M \cdot r)\cos(Q \cdot r), \quad \text{Eq. (2)}$$

$$M = \frac{Q_2 - Q_1}{2}, Q = \frac{Q_2 + Q_1}{2}$$

The vector M in subsequent is called Moiré pattern wave vector or, for short, Moiré vector M, while Q is the carrier grating vector of the resultant VBG. The representation (2) is instructive for the understanding of the performance of Moiré Bragg gratings, if only $|M| \ll |Q|$. Otherwise consideration of each of the individual gratings, $\cos(Q_1 \cdot r)$ and $\cos(Q_2 \cdot r)$, yields a more adequate description of the diffraction processes, the direction of M in some cases may be the same as the direction of Q, and in other cases may differ from it. Particular examples of MBGs implemented by the co-inventors are described below.

Consider two uniform gratings with equal amplitude and slightly different vacuum resonant frequencies $\lambda_1$ and $\lambda_2$ and wave vectors along z-axis recorded in the same medium. Then total modulation of refractive index is:

$$n(z) = n_0 + n_1(z)\cos(Qz), Q = \frac{4\pi n_0}{\lambda_0}, \lambda_0 = \frac{\lambda_1 + \lambda_2}{2}, \quad \text{Eq. (3)}$$

$$n_1(z) = N_1 \sin\frac{\pi z}{t_\pi}, t_\pi = \frac{\lambda_0^2}{2n_0 \Delta \lambda}, \Delta \lambda = \lambda_2 - \lambda_1,$$

where $n_0$ is average refractive index of a material, $\lambda_0$ is Bragg resonant wavelength of the MBG in vacuum, $n_1(z)$ is slowly varying envelope of modulation amplitude with constant $N_1$ and spatial semi-period $t_\pi$. The performance of the proposed device depends essentially on the fact that the slowly varying envelope $n_1(z)$ changes sign between two spatial semi-periods $t_\pi$. This can be described as a π-phase shift between the sequential gratings defined by two semi-periods.

Propagation of electromagnetic waves inside a VBG may be formulated in terms of counter-propagating waves $A(z)\exp(-i\omega t + ik_z z)$ and $B(z)\exp(-i\omega t - ik_z z)$ with $k_z = n_0 \cos\theta_{in}\omega/c$, where $\theta_{in}$—the angle of propagation inside VBG in case of tilted incidence. Coupled equations for slowly varying envelopes $A(z)$ and $B(z)$ are the following $$\frac{dA}{dz} = i\kappa(z)Be^{-2iDz}, \frac{dB}{dz} = -i\kappa(z)Ae^{2iDz}, \quad \text{Eq. (4)}$$

$$\kappa(z) = \frac{\omega n_1(z)}{2c\cos\theta_{in}}, D = \frac{\omega n_0}{c}\cos\theta_{in} - \frac{Q}{2}$$

Here $\kappa(z)$ is a coupling parameter and D is z-independent parameter of detuning from Bragg condition, D=0. This condition is angular dependent so at skew propagation the resonant wavelength is shifted $\lambda_{res}=\lambda_0 \cos\theta_{in}$. The solution of system (4) for a considered linear media can be represented in matrix form as $$A(z)=M_{AA}(z)A(0)+M_{AB}(z)B(0), B(z)=M_{BA}(z)A(0)+M_{BB}(z)B(0) \quad \text{Eq. (5)}$$

In the absence of losses, the matrix $\hat{M}$ belongs to group SL(1,1), and with account of boundary condition B(L)=0, the amplitude reflection coefficient for element of length L equals $$r=r(A\leftarrow B)=-M_{BA}(L)/M_{BB}(L)=-e^{-2i\eta} \tanh S,$$
$$R=\tanh^2 S \quad \text{Eq. (6)}$$

where $\eta$ is phase parameter and S is the so-called "Strength of Reflection" as described by a co-inventor in L. B. Glebov, J. Lumeau, S. Mokhov, V. Smirnov, and B. Ya. Zeldovich, "Reflection of light by composite volume holograms: Fresnel corrections and Fabry-Perot spectral filtering", J. Opt. Soc. Am. A 25, 751-764 (2008), where R is reflectance.

The solution of Equation (4) for uniform gratings is given by well-known Kogelnik's result described in H. Kogelnik, "Coupled wave theory for thick hologram gratings", Bell Syst. Tech. J. 48, 2909-2945 (1969). Propagation of electromagnetic waves in non-uniform RBG with z-dependent $n_0(z)$, $n_1(z)$ and Q(z) in general case can be studied numerically in S.

V. Mokhov, L. B. Glebov, V. I. Smirnov, and B, Ya. Zeldovich, "Propagation of Electromagnetic Waves in Non-Uniform Volume Bragg Gratings", in Frontiers in Optics, OSA Technical Digest (CD) (Optical Society of America, 2008). If the coupling $\kappa(z)e^{-2iDz}$ is a real function, e.g. at $\kappa=\kappa^*$, D=0, then the matrix M(z) for system (4) can be found and we get the reflection coefficient r:

$$\hat{M}|_{D=0} = \begin{pmatrix} \cosh S_0 & i\sinh S_0 \\ -i\sinh S_0 & \cosh S_0 \end{pmatrix}, \quad \text{Eq. (7)}$$

$$r_0 = i\tanh S_0,$$

$$S_0 = \int_0^L \kappa(z)dz = \frac{\omega}{2c}\int_0^L n_1(z)dz$$

Figure 3:
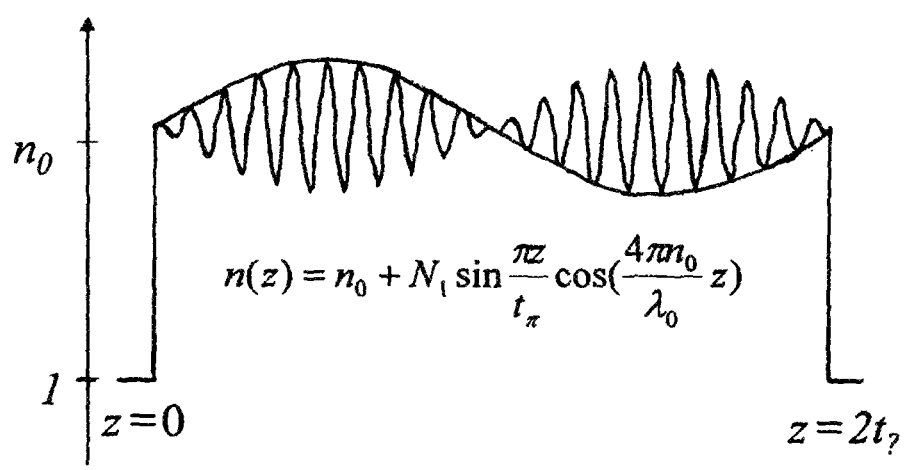
FIG. 3 shows a spatial profile of refractive index modulation in a MBG with one Moiré period, i.e. two semi-periods with π phase shift between them.
Figure 4:
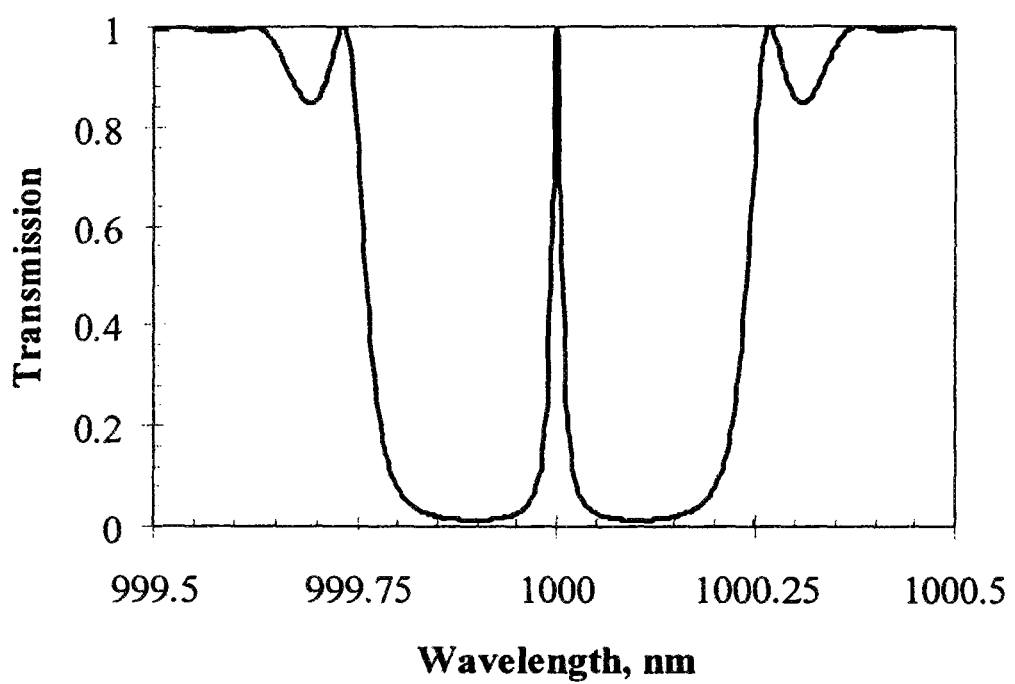
FIG. 4 shows a modeled transmission spectrum of a Moiré Bragg grating with two Moiré semi-periods.

Typical refractive index modulation profile along the grating vector of a MBG is shown in FIG. 3. There is a high frequency modulation of the refractive index change corresponding to a period close to the periods of single gratings. In addition, the envelope modulates the refractive index with a low frequency. The period of this low frequency envelope is called a Moiré period and includes two semi-periods of the thickness of $t_\pi$ each. Spectral shape of a grating for a normal incident beam, which corresponds to collinear grating and wave vector, and identical phase of refractive index modulation profile across the aperture is shown in FIG. 4. This filter reflects a narrow band comparable with a conventional reflecting Bragg grating with similar parameters which comprised typically between approximately 50 pm and approximately 1 nm. Outside this band, only low intensity side lobes are observed and almost all the light is transmitted through the filter. The main feature of this filter, compared to a regular reflecting Bragg grating is that in the middle of the reflection lobe, an ultra-narrowband resonance (generally less than approximately 100 pm) appears, which corresponds to a high transmission of the filter. For a lossless uniform MBG, this transmission at resonance is equal to approximately 100%.

There are several factors that influence this transmission such as the losses of the material or its optical homogeneity (i.e. fluctuations of the refractive index over the filter's thickness and aperture). Regarding losses, those losses are very low in PTR glass, typically below approximately $10^{-3}$ cm$^{-1}$ in the near infrared region and therefore allow obtaining high transmission ultra-narrow band filters. Regarding the optical homogeneity, one can expect that it must be better than approximately 10 ppm. Actual melting technology of PTR glass allows obtaining such homogeneous glass and therefore permits the fabrication of filters with ultra-narrow bandwidth and large aperture.

FIG. 4 shows a transmission spectrum of a Moiré Bragg grating (MBG) with two Moiré semi-periods. The wavelength $\lambda_0$ of the resonance is approximately 1 µm, Bragg wavelength of each elementary grating is shifted by approximately 75 µm on each side of $\lambda_0$. The thickness is approximately 3.1 mm and the refractive index modulation is approximately 200 ppm and the grating vector is normal to the surface. It was found that the spectral width of the rejection band of a MBG, which is shown in FIG. 4, is close to the total width of the incoherent combination of the two single RBGs. However, for applications requiring a larger rejection band, this can be increased by incoherent combining of this grating with a single RBG as was shown by co-inventors in J. Lumeau, V. Smirnov and L. B. Glebov, "Tunable narrow-band filter based on a combination of Fabry-Perot etalon and Volume Bragg Grating" Optics Letters 31 (16), 2417-2419 (2006).

Figure 5C:
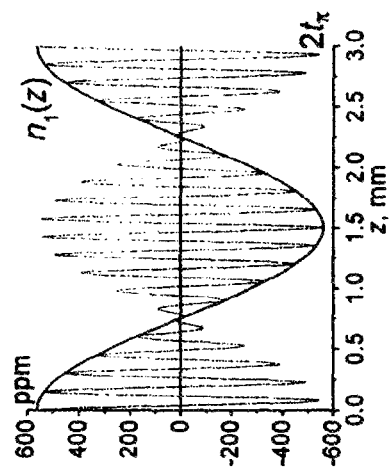
FIG. 5c shows a spatial refractive index profile for a Moiré Bragg grating of two semi-period thick with Moiré pattern $N_1 \sin(\pi z/t_\pi + \gamma)$ when $\gamma=\gamma=\pi/2$.
Figure 5B:
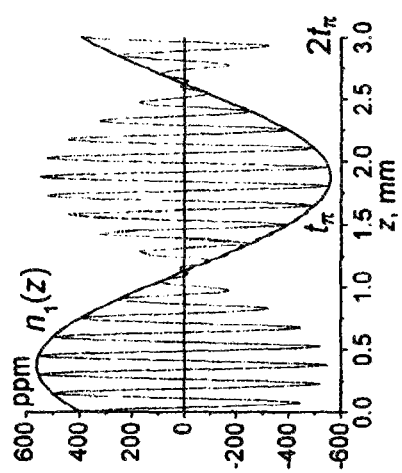
FIG. 5b shows a spatial refractive index profile for a Moiré Bragg grating of two semi-period thick with Moiré pattern $N_1 \sin(\pi z/t_\pi + \gamma)$ when $\gamma=\pi/4$.
Figure 5A:
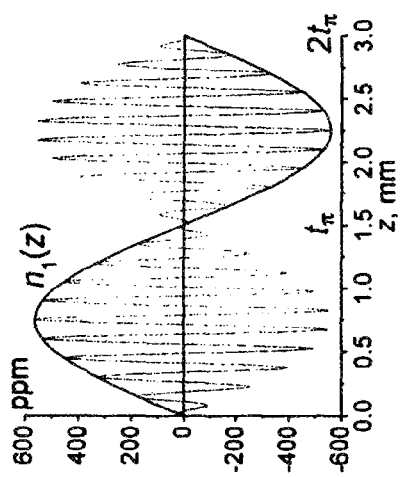
FIG. 5a shows a spatial refractive index profile for a Moiré Bragg grating of two semi-period thick with Moiré pattern $N_1 \sin(\pi z/t_\pi + \gamma)$ when $\gamma=0$.
Figure 6:
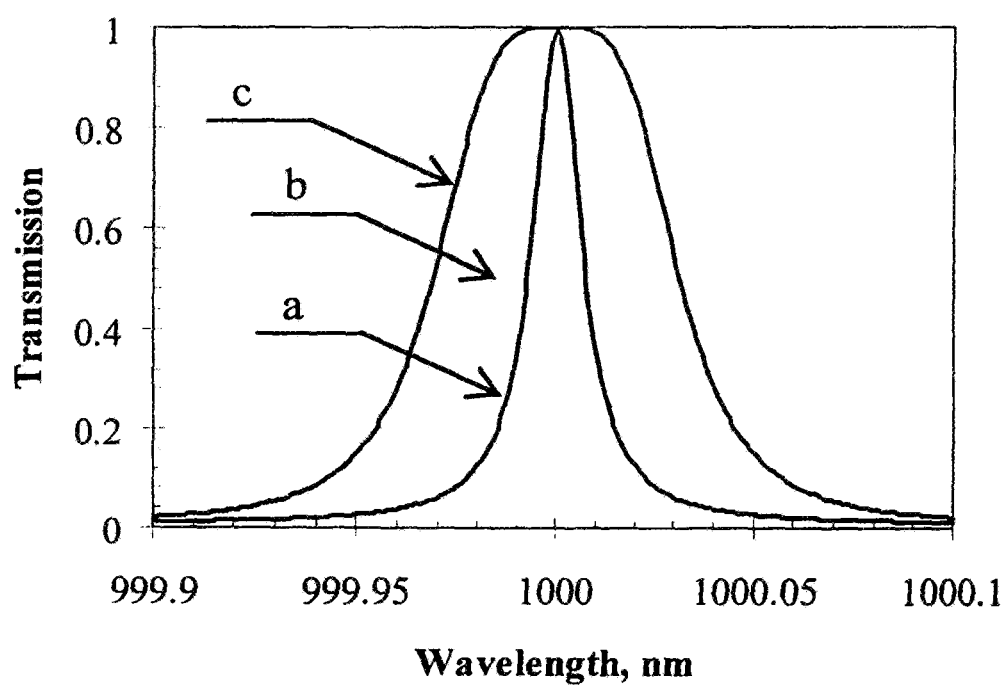
FIG. 6 shows the modeled transmission spectra of a Moiré Bragg grating with different original phases of Moiré pattern shown in FIGS. 5a, 5b and 5c.

FIGS. 5a, 5b and 5c shows three Moiré Bragg gratings of two semi-period thick with different original phase γ of Moiré pattern $N_1 \sin(\pi z/t_\pi+\gamma)$ when γ=0, γ=π/4, and γ=π/2, respectively. FIG. 6 shows the transmission spectra of a Moiré Bragg grating with different original phases of Moiré pattern shown in FIGS. 5a, 5b and 5c. Consider a MBG with two Moiré semi-periods of the refractive index modulation profile where original phases of Moiré pattern are different as shown in FIGS. 5a, 5b and 5c. An important feature of such filters is that the Bragg wavelength is the same for all of them while spectral width and shape are controlled by the original phase of the Moiré pattern as shown in FIG. 6. By varying the original phase of Moiré pattern one can modify transmission peak from a sharp narrow spectral line to a table-top band.

A way to produce a tunable Moiré filter is to arrange a tilt of grating vector in respect to the plate normal. In this example, phase shift of the Moiré pattern varies linearly with lateral coordinate X and spectral shape of a Moiré Bragg gratings would be gradually varied across the aperture similar to that shown in FIG. 6.

It is possible to vary a number of Moiré periods of refractive index modulation profile in order to change the spectral profile of the Moiré Bragg grating. In classical Fabry-Perot, the use of multiple cavities separated by quarter wave layers allows for obtaining their coherent combination and therefore increasing the rejection of the filter as well as the sharpness of the edges and the flatness of the top of the resonances. In the present invention, the use of several Moiré periods of refractive index modulation profile allows obtaining a similar effect. Moreover, cavities are automatically phase matched.

Figure 7:
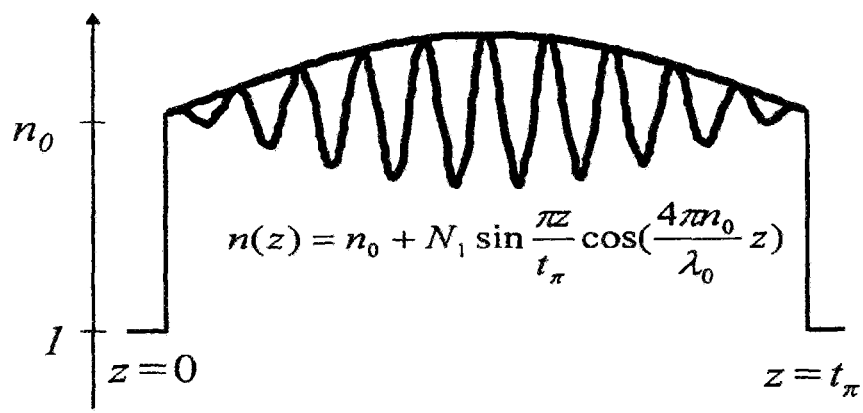
FIG. 7 shows the spatial refractive index modulation profile in a Moiré Bragg grating with one semi-period.
Figure 8:
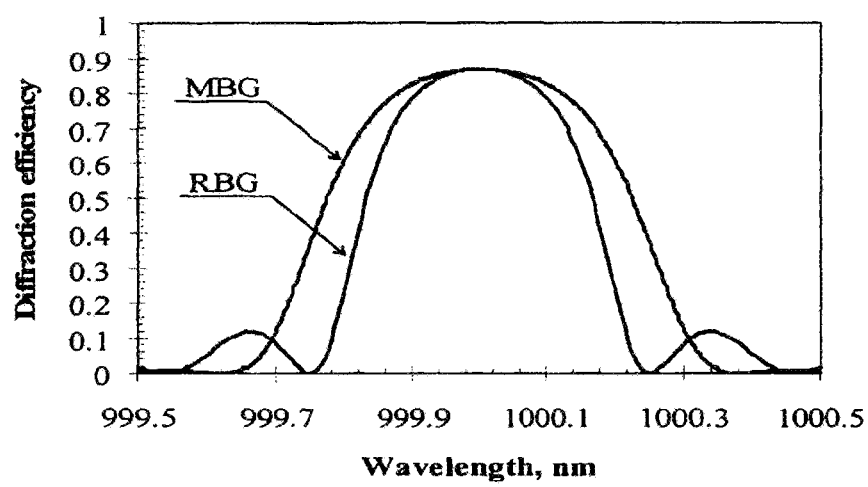
FIG. 8 is a graph showing the reflection spectra of a uniform reflective Bragg grating and of a Moiré Bragg grating with one semi-period as shown in FIG. 7.

Another useful feature of a Moiré structure is apodization of volume holographic elements. Up to now the co-inventors considered the use of two or more Moiré semi-periods of refractive index modulation profile that would form a Fabry-Perot cavity. However, it is possible to limit this grating to only one semi-period of refractive index modulation with zero refractive index modulation at the surfaces of a grating as shown in FIG. 7. It was shown in J. M. Tsui, C. Thompson, V. Mehta, Jeffrey M. Roth, V. I. Smirnov and L. B. Glebov, "Coupled-wave analysis of apodized volume gratings", Opt. Express 12 6642-6653 (2004), that when such a refractive index modulation profile is used, then the reflection profile of the RBG is apodized, i.e. there are no side lobes. As shown in FIG. 8, a single semi-period Moiré Bragg grating allows obtaining apodization of the reflection spectrum of reflecting Bragg gratings.

There are several approaches to record Moiré Bragg gratings. In the general case Moiré Bragg gratings can have different periods and different directions of grating vectors. Experimental results demonstrate this general principle with the example of collinear grating vectors. Two examples were considered.

Figure 9:
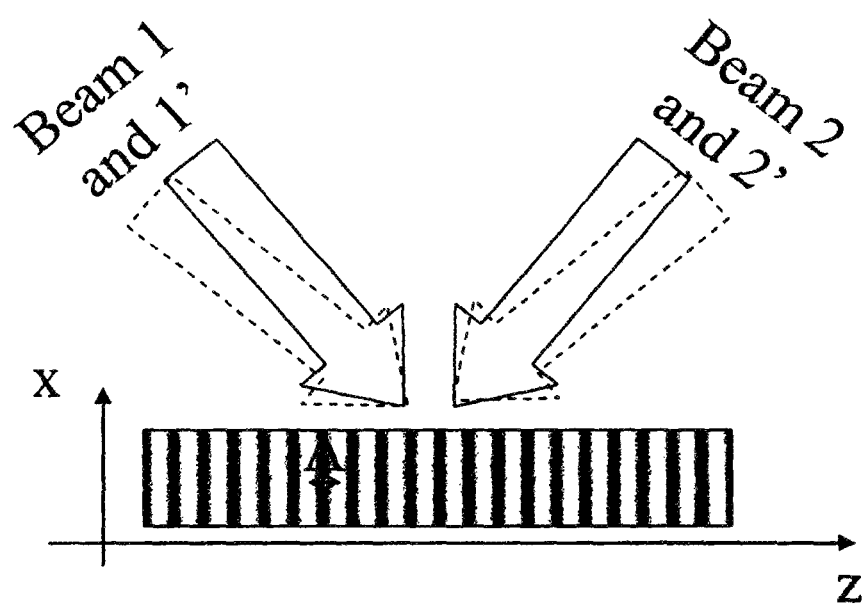
FIG. 9 shows a two-beam one-sided recording of a Moiré grating.

The first example is a two-beam one-sided recording. This method includes recording of two volume Bragg gratings with different periods using sequential exposure to the interference patterns produced by two distinct pairs of coherent beams launched from the same side of the photosensitive plate as shown in FIG. 9. The periods of each of the gratings ($\Lambda_1, \Lambda_2$) is determined by the angle between the two interfering beams inside of the photosensitive plate:

$$2n_0\Lambda_{1,2} = \frac{\lambda_R}{\sin(\theta_{1,2})} = \lambda_B \qquad \text{Eq. (8)}$$

where $n_0$ is the refractive index of a recording medium, $\lambda_R$ the wavelength of recording, $\theta$ the angle between the two beams inside the recording medium and $\lambda_B$ the wavelength diffracted by the recorded grating at normal incidence. It is therefore possible to change the period of the grating by changing the angle between the two beams. With high precision rotary stages, the angle between the two beams can be controlled with precision better than 0.001°. The change of Bragg wavelength corresponding to such a change of angle is given by:

$$\Delta\lambda_B = \frac{\lambda_B}{\tan(\theta)}\Delta\theta \qquad \text{Eq. (9)}$$

Figure 10A:
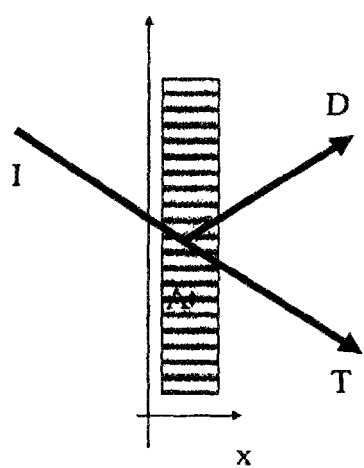
FIG. 10a shows a Moiré Bragg grating in transmission geometry.
Figure 10B:
FIG. 10b shows a Moiré Bragg grating in reflection geometry.

With such resolution, the shift of Bragg wavelength can be controlled with a precision better than approximately 50 µm at approximately 1 µm. As is shown later, such shift allows obtaining filter with bandwidth in the range of a few picometers in a few millimeters PTR glass substrates. By means of a two-beam single-sided recording, the vector of a MBG can be perpendicular to the normal of the photosensitive plate surface, i.e. along the z axis as shown in FIG. 9. Thus, this object can be used as a transmitting grating as shown in FIG. 10a. For a narrow beam with aperture much less than semi-period of Moiré period scanning of this beam across the aperture would gradually vary diffraction efficiency. For a large aperture beam this grating can be used for shaping of intensity of diffracted and transmitted beams in near and far fields. FIG. 10b shows a Moiré reflecting Bragg grating in reflection geometry. The photosensitive plate can be cut along the x direction in a manner to keep only one semi-period of the refractive index modulation for apodization of a reflecting notch filter or two semi-periods for ultra-narrowband transmitting filter as shown in FIG. 10b.

Figure 11:
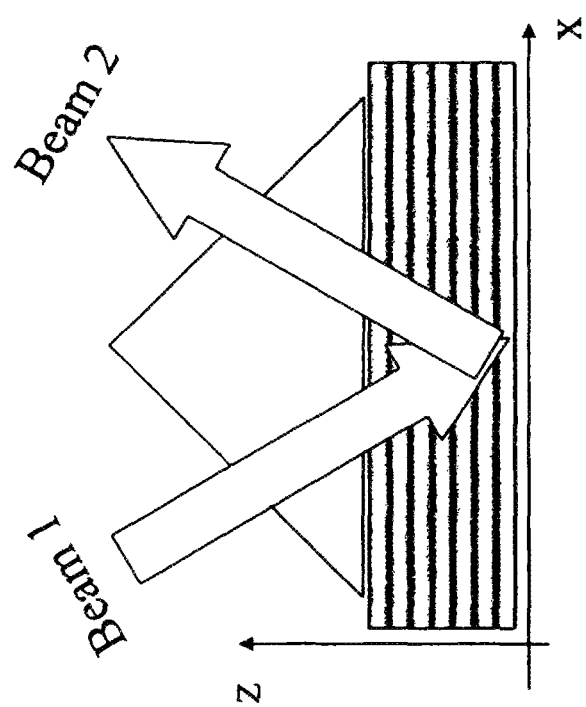
FIG. 11 shows a single-beam one-sided recording of a grating.

The second method is a one-beam one-sided recording. In this case, interference patterns are produced by total internal reflection as described in K. Stetson, "Holography with totally internally reflected light", Appl. Phys. Lett. 11, P. 225, (1967). A prism is placed on the top of the sample to be recorded in order to couple light inside the PTR glass sample. When light propagates though the PTR glass and reaches the rear face of the PTR glass, the incident angle is larger than the angle of total internal reflection and the beam is completely reflected. The reflected beam travels back to the front face of the PTR glass and exits through the prism. During this process the two beams propagating inside the PTR glass, the incident beam and the reflected beam, interfere as shown in FIG. 11. By controlling the angle of incidence of the recording beam, and therefore the angle between the incident and reflected beams, it is possible to control the period of the recorded grating. By placing a layer of refractive index matching material and a mirror under the rear surface of the PTR glass, it is possible to control the original phase of elementary volume Bragg grating and therefore a Moiré pattern when two superimposed VBGs are recorded.

Another way to control difference of periods is to change the temperature of a photosensitive plate under the recording while keeping the same incident angle. Therefore, using these methods, it is possible to record two superimposed gratings with slightly different periods and to fabricate a Moiré Bragg grating. By choosing correctly the thickness of a photosensitive plate in accordance with the shift of grating period, Moiré Bragg grating having one or two periods of refractive index modulation profile can be fabricated.

Three main parameters define the final bandwidth of such a Moiré Bragg filter include 1) the difference between periods of the two VBGs, i.e. difference between central Bragg wavelengths; 2) the thickness of the Moiré Bragg grating; and 3) the amplitude of refractive index modulation of each volume Bragg grating.

Figure 12A:
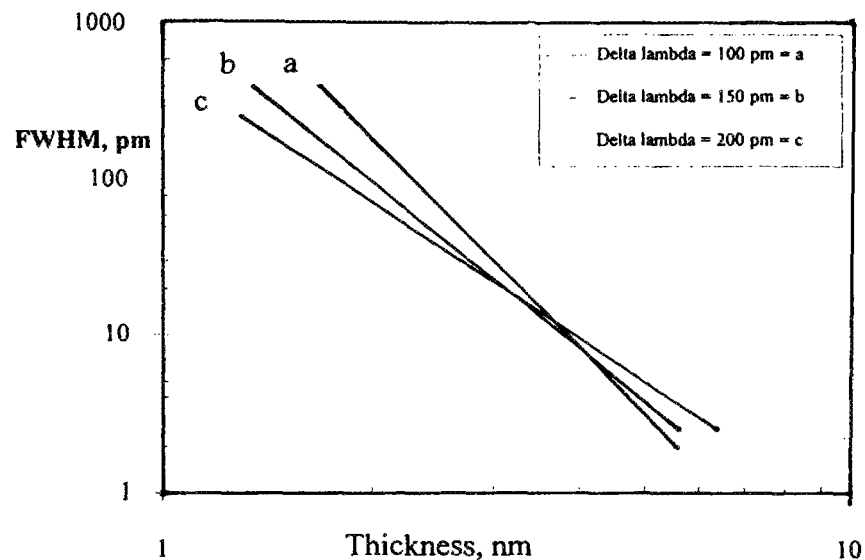
FIG. 12a is a graph showing the dependence of spectral selectively (FWHM) of a Moiré grating on the thickness for different separations of Bragg wavelengths of elementary reflecting Bragg gratings at a constant refractive index modulation of approximately 200 ppm.
Figure 12B:
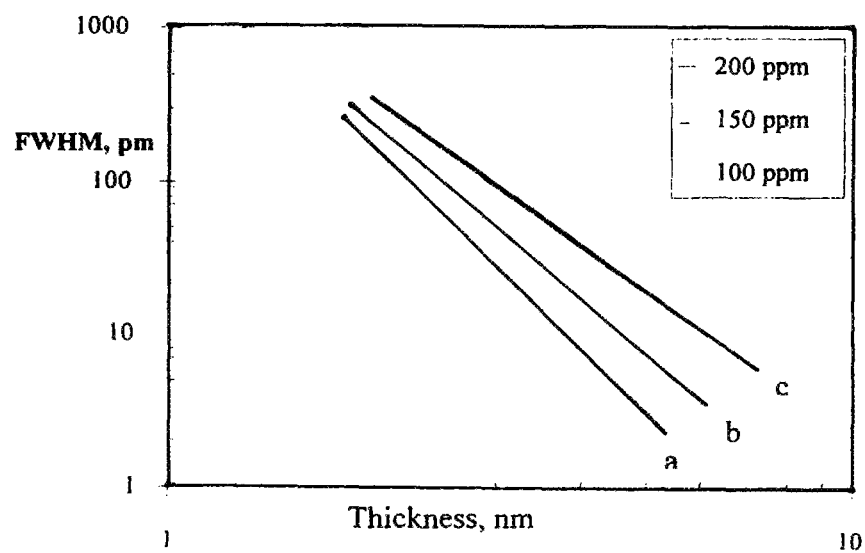
FIG. 12b is a graph showing the dependence of spectral selectively (FWHM) of a Moiré grating on the thickness for different values of refractive index modulation at constant separation between Bragg wavelengths of approximately 100 μm.

The dependence of spectral width (FWHM) of a transmission peak on thickness of the Moiré volume Bragg grating for various separations between Bragg wavelengths at constant refractive index modulation at approximately 200 ppm is shown in FIG. 12a and for different values of refractive index modulation at constant separation between Bragg wavelengths at approximately 100 pm is shown in FIG. 12b. For all simulations, it was assumed that it phase shift occurs in the center of the Moiré grating, resulting in a symmetric and resonant filter. It is seen that for reasonable parameters of gratings, it is possible to fabricate a filter with a few picometers bandwidth for approximately 1064 nm region in a PTR glass with thickness less than approximately 10 mm.

To confirm these theoretical modeling, a Moiré Bragg grating was experimentally demonstrated. The Moiré grating was recorded in a PTR glass wafer using the two-beam one-sided technique. The two recorded reflecting Bragg gratings had central wavelengths of approximately 1547.2 and approximately 1547.4 nm. The sample was thermally developed and then the positions of zeros at the refractive index modulation profile were determined by scanning of a He—Ne laser beam with a diameter of approximately 1 mm along the Z axis as shown in FIG. 9. This sample was cut in the vicinity of the zeros of the refractive index modulation profile to a thickness equal to approximately 6 mm i.e. two semi-periods ($2t_\pi$) and then ground, polished and AR coated. The overall refractive index modulation was estimated in the range of approximately 120 ppm.

Figure 13:
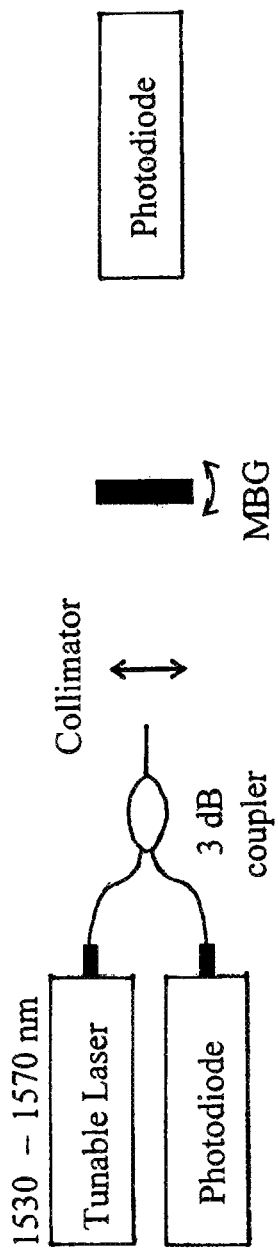
FIG. 13 is a block diagram showing an experimental set-up for measurement of spectral selectively of Moiré gratings recorded in photosensitive glass.

Spectral selectivity of this Moiré grating was characterized using the high resolution setup shown in FIG. 13. This setup was composed with a tunable Santec TSL 220 laser diode source operating at approximately 1550 nm and having approximately 1 pm resolution. The laser radiation was filtered by a single-mode fiber and coupled into a collimator. The approximately 0.5 mm diameter beam was launched to the Moiré grating and the transmitted signal was measured using an InGaAs amplified photodiode associated with a data acquisition card. In order to adjust the filter at normal incidence, a 3 dB fiber coupler was used between the laser and the delivery fiber. Another amplifying InGaAs photodiode was used to measure power reflected from the Moiré grating, re-coupled to the fiber and directed to the second photodiode by a coupler.

Figure 14:
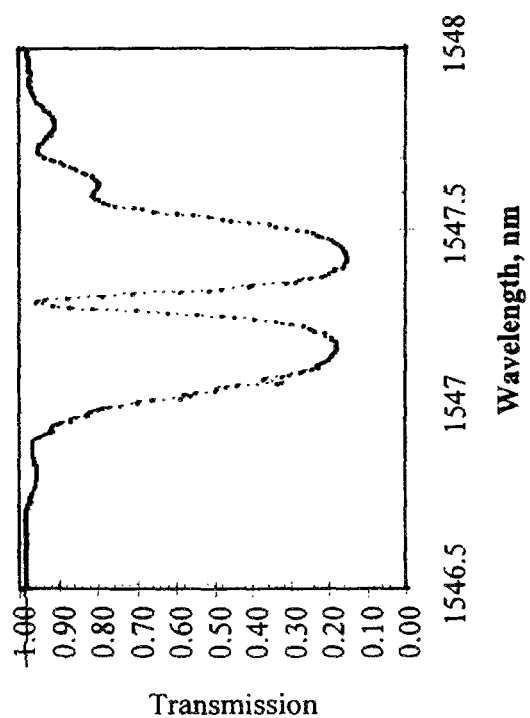
FIG. 14 is a graph showing experimental spectral selectively of a Moiré grating recorded in PTR glass, the separation between the wavelengths of elementary reflecting Bragg gratings of approximately 200 pm.

Using this scheme the Moiré Bragg grating can be aligned by auto-collimation. Typical spectral transmission measured at the throughput of the filter is shown in FIG. 14. This filter shows transmission greater than approximately 95%. The bandwidth is equal to approximately 50 pm at FWHM and a rejection bandwidth to approximately 200 pm. Rejection outside the resonance is in the range of approximately 10 dB. The filter parameters can be improved by optimization of a fabrication process and combining it with an additional Bragg gratings or using Volume Bragg gratings with higher diffraction efficiencies as described by at least one co-inventor in J. Lumeau, V. Smirnov and L. B. Glebov, "Tunable narrow-band filter based on a combination of Fabry-Perot etalon and Volume Bragg Grating" Optics Letters 31 (16), 2417-2419 (2006).

Figure 15:
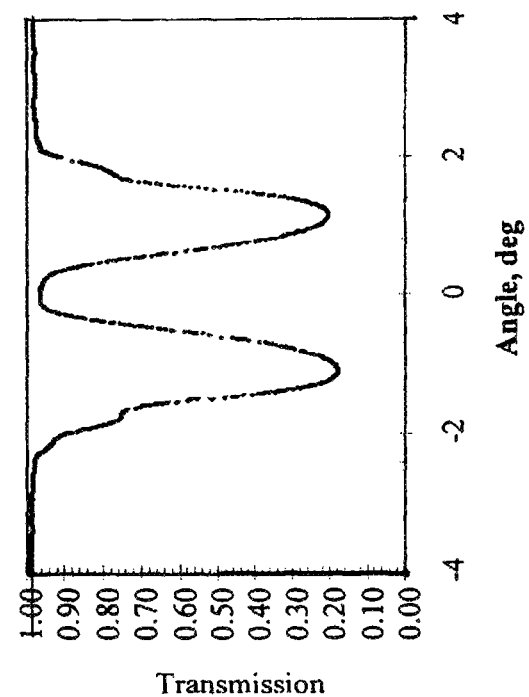
FIG. 15 is a graph showing experimental angular selectively of a Moiré grating recorded in PTR glass which is shown in FIG. 14.

Angular selectivity was also characterized by fixing the Moiré Bragg grating to a rotary stage and measuring the evolution of the transmitted power versus grating inclination, the incidence angle, at constant incident wavelength as shown in FIG. 15. As shown, angular selectivity at FWHM is equal to approximately 1 degree and is therefore very similar to the angular selectivity of a regular reflecting Bragg grating with similar thickness and refractive index modulation.

In summary, the present invention provides a method of fabrication of complex diffractive optical element by recording of two or more volume Bragg gratings with different periods in the same volume of a photosensitive material. The two or more volume Bragg grating recording results in additional spatial modulation of a refractive index modulation profile with a period determined by the difference between the periods, called a Moiré period, of elementary volume Bragg gratings. This diffractive element is called volume Moiré Bragg grating. In a preferred embodiment, the photosensitive material is PTR glass. The method can include fabrication of apodized volume Bragg grating with suppressed side lobes wherein a complex diffractive optical element includes one semi-period of Moiré pattern.

The present invention also provides a method of fabricating a high throughput narrowband transmitting filter by recording of two or more volume Bragg gratings with different periods in the same volume of a photosensitive material. The two or more volume Bragg grating recording results in additional spatial modulation of a refractive index modulation profile with a period determined by the difference between the periods, called a Moiré period, of elementary volume Bragg gratings, wherein a complex diffractive optical element includes two semi-periods of Moiré pattern. As with the previous examples, the photosensitive material is PTR glass in a preferred embodiment.

The method according to the present invention also allows fabricating of complex spectral and angular filters by recording of two or more volume Bragg gratings with different periods in the same volume of a photosensitive material, such as but not limited to PTR glass. The two or more volume Bragg grating recording results in additional spatial modulation of a refractive index modulation profile with a period determined by the difference between the periods, called a Moiré period, of elementary volume Bragg gratings, wherein the number of Moiré semi-periods is arbitrary and possibly not an integer.

In another example, the method includes fabrication of complex spectral and angular filters with different shape and the same resonant wavelength by recording of two or more volume Bragg gratings with different periods in the same volume of a photosensitive material, such as PTR glass. Recording of two or more volume Bragg grating results in additional spatial modulation of a refractive index modulation profile with a period determined by the difference between the periods, called a Moiré period, of elementary volume Bragg gratings, wherein Moiré vector is tiled in respect to normal to the surface and/or direction of beam propagation.

Other examples include fabrication of complex spectral and angular filters based on Moiré effect wherein elementary VBGs not all having the same amplitude of refractive index modulation; production of a MBG by sequential two-beam one-sided holographic recording keeping vectors of elementary gratings collinear; production of a Moiré RBG by sequential single beam one-sided holographic recording based on total internal reflection from the rear surface; and production of MBG by sequential single beam one-sided holographic recording with a layer of a material with refracting index higher that that in air and additional adjustable mirror placed behind the rear surface which provides control of original phase of Moiré pattern. Yet another example is the production of a MBG by sequential two-beam two-sided holographic recording keeping vectors of elementary gratings collinear wherein two beams are produced by a beam splitter and an interference pattern is produced by redirecting of these beams by reflecting elements. In this example, a position of one of the redirecting reflecting elements is controlled with high precision to control original phase of VBG and of the Moiré pattern.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of fabricating a complex diffractive optical element, comprising:
   providing only one single volume of a permanently-recordable photosensitive material; and
   permanently recording at least two different volume Bragg gratings having different periods, each of which is produced by the interference of two beams in the only one single volume of the permanently-recordable photosensitive material, wherein the two volume Bragg gratings occupy the same cross sectional volume of the permanently-recordable photosensitive material perpendicular to the surface normal of the only one single volume of the permanently-recordable photosensitive material resulting in additional spatial modulation of a permanent refractive index modulation profile characterized by a larger period determined by a difference between the periods of the at least two volume Bragg gratings to obtain a permanent volume Moiré Bragg grating occupying the whole cross sectional volume of the permanently-recordable photosensitive material and having a Moiré period determined by a difference between the two different volume Bragg grating periods.

2. The method of claim 1, wherein the recording at least two different volume Bragg gratings further comprises:
   recording a first volume Bragg grating by exposure to a first interference pattern produced by two distinct beams, the first period of the first volume Bragg grating being determined by the angle between the two interfering beams inside the only one single volume of the permanently-recordable photosensitive material;
   shifting a position the two distinct coherent beams;
   recording a second volume Bragg grating by exposure to a second interference pattern produced by two distinct shifted beams, the period of the second volume Bragg grating being determined by the angle between the two shifted interfering beams inside the photosensitive material to produce a volume Moiré Bragg grating; and
   controlling the angle between the two distinct beams recording the first and second volume Bragg grating to vary a period of the volume Moiré Bragg grating produced.

3. The method of claim 1, wherein recording at least two different volume Bragg gratings with different periods further comprises:
   recording a semi-period of a Moiré pattern to produce a volume Bragg grating with suppressed side lobes.

4. The method of claim 1, wherein recording at least two different volume Bragg gratings with different periods further comprises:
   recording two semi-periods of a Moiré pattern to produce a high throughput narrowband transmitting filter.

5. The method of claim 1, wherein recording at least two different volume Bragg gratings with different periods further comprises:
   recording an arbitrary number of Moiré semi-periods to produce a complex diffractive optical element with specific spectral and angular selectivity.

6. The method of claim 1, wherein recording at least two different volume Bragg gratings with different periods further comprises:
   tilting the Moiré vector in respect to the normal to the surface and/or direction of beam propagation to produce a diffractive optical element with complex spectral and angular features.

7. The method of claim 1, wherein, recording at least two different volume Bragg gratings comprises:
   recording at least two different volume Bragg gratings each having a different amplitude of refractive index modulation to produce a complex spectral and angular filter based on a Moiré effect.

8. The method of claim 1, wherein the recording is sequential two-beam one-sided holographic recording keeping the vectors of the gratings collinear, the period of each one of the recordings determined by an angle between the two interfering beams inside of the one single volume of photosensitive material.

9. The method of claim 1, wherein the recording is sequential single-beam one-sided holographic recording based on a total internal reflection from the rear surface of the photosensitive material to fabricate a Moiré reflecting Bragg grating.

10. The method of claim 1, wherein the recording comprises:
    sequential single-beam one-sided holographic recording with a layer of material having a refractive index greater than the refractive index in air; and
    adjusting an adjustable mirror located adjacent to the rear surface of the photosensitive material to provide control of original phase of the Moiré pattern.

11. The method of claim 1, wherein the recording comprises:
    using a beamsplitter to produce two coherent beams; and
    redirecting each of the two coherent beams with two corresponding reflecting elements to produce an interference pattern for a sequential two-beam two-sided holographic recording keeping vectors of the elementary gratings collinear.

12. The method of claim 11, further comprising:
    controlling a position of one of the redirecting reflecting elements with high precision to control the original phase of the volume Bragg grating and the Moiré pattern.

13. A method of fabricating a complex diffractive optical element consisting essentially of the step of:
    providing only one single plate of a permanently-recordable photosensitive material;
    recording a first volume Bragg grating having a first period and a first direction of grating vector in a cross sectional volume of the permanently-recordable photosensitive material by exposure to a first interference pattern produced by a first pair of beams; and
    recording a second volume Bragg grating having a second, different period and second different grating vector in the same cross sectional volume of the photosensitive material by exposure to a second interference pattern produced by a second pair of beams, wherein the first and second periods are determined by an angle between the first and second pair of beams, respectively, resulting in additional spatial modulation of a refractive index modulation profile with a period determined by the difference between the first and second periods of the at least two volume Bragg gratings as a permanent Moiré period.

14. The method of claim 13, wherein the step of recording is a single beam one-sided recording.

15. The method of claim 14, wherein the recording step further comprises:
    placing an optical element adjacent to a first side of the plate;
    coupling a light beam through the optical element into the only one single plate, wherein the incident angle of the light beam propagating through the plate is larger at the second side of the plate than the angle of total internal reflection and the incident beam is reflected and the reflected beam propagates back to the first side of the only one single plate interfering with the incidence beam to record the volume Bragg grating wherein the sequential coupling of the light beam at a different incident angle produces a second elementary grating and a Moiré Bragg grating according to a difference in periods of the elementary gratings.

16. The method of claim 15, wherein providing the only one single plate of the permanently-recordable photosensitive material further comprises:
providing a PTR glass.

17. The method of claim 15, wherein the placing an optical element adjacent to a first side of the plate comprises:
placing a prism adjacent to a first side of the plate.

18. The method of claim 15, further comprising the step of:
controlling an angle of incidence of the recording beam to control the angle between the incident and reflected beams to control the period of the recorded grating.

19. The method of claim 15, further comprising the step of:
placing a layer with refractive index matching photosensitive material and a mirror under the second surface of the photosensitive glass plate to control the original phase of elementary volume Bragg grating and a Moiré pattern when two superimposed volume Bragg gratings are recorded.

20. The method of claim 15, further comprising the step of:
change the temperature of a photosensitive plate during recording while keeping the same incident angle to control a difference of periods.

21. The method of claim 15, further comprising the step of:
selecting the thickness of the photosensitive plate in accordance with the shift of grating period to fabricate the Moiré Bragg grating having one or two periods of refractive index modulation profile.

22. The method of claim 13, further comprising the step of:
controlling a bandwidth of the Moiré Bragg grating by the difference between periods of the at least two volume Bragg gratings.

23. The method of claim 15, further comprising the step of:
controlling the bandwidth of the Moiré Bragg grating by the thickness of the photosensitive plate.

24. The method of claim 15, further comprising the step of:
controlling the bandwidth of the Moiré Bragg grating by the amplitude of the refractive index modulation of each recorded volume Bragg grating.

25. The method of claim 13, further comprising the step of:
arranging a tilt of the grating vector in respect to the plate normal to produce a tunable Moiré filter, wherein the phase shift of the Moiré pattern varies linearly with lateral coordinate X and spectral shape of a Moiré Bragg gratings would be gradually varied across the aperture.

26. The method of claim 13, further comprising the step of:
varying a number of Moiré periods of refractive index modulation profiles to change the spectral profile of the Moiré Bragg grating.

27. The method of claim 13, further comprising the step of:
providing one single semi-period Moiré Bragg grating to obtain apodization of the reflection spectrum of reflecting Bragg gratings.

28. A complex diffractive optical element comprising:
providing only one single permanently-recordable photosensitive material; and
a plurality of volume Bragg gratings each having different periods occupying the same entire cross sectional volume of the permanently-recordable photosensitive material, wherein the plurality of volume Bragg gratings is characterized by a spatial modulation of a refractive index modulation profile with a period determined by the difference between the periods of the plurality of the volume Bragg gratings as a Moiré period, further wherein the plurality of the volume Bragg gratings occupying the same cross sectional volume are perpendicular to the surface normal of the only one single permanently-recordable photosensitive material combining to produce a permanent Moiré volume Bragg grating.

29. The diffractive optical element of claim 25, wherein the photosensitive material is PTR glass.

* * * * *